(12) United States Patent
Bieber et al.

(10) Patent No.: US 8,013,841 B2
(45) Date of Patent: Sep. 6, 2011

(54) ENHANCED LIFT DETECTION TECHNIQUE FOR A LASER ILLUMINATED OPTICAL MOUSE SENSOR

(75) Inventors: Lawrence Bieber, Colorado Springs, CO (US); Gil Afriat, Monument, CO (US); James Harold Lauffenburger, Colorado Springs, CO (US); Kevin Scott Buescher, Colorado Springs, CO (US)

(73) Assignee: EM Microelectronic-Marin S.A., Marin (CH)

( * ) Notice: Subject to any disclaimer, the term of this patent is extended or adjusted under 35 U.S.C. 154(b) by 857 days.

(21) Appl. No.: 11/424,747

(22) Filed: Jun. 16, 2006

(65) Prior Publication Data

US 2007/0290991 A1 Dec. 20, 2007

(51) Int. Cl.
*G09G 5/08* (2006.01)

(52) U.S. Cl. ........ 345/166; 345/156; 345/175; 345/179; 345/158; 178/18.09; 178/19.05; 250/221; 250/208.1

(58) Field of Classification Search .......... 345/161–167, 345/156–158, 426, 520, 173, 184, 581, 175, 345/179; 700/83; 382/154; 250/557, 221, 250/208.1; 341/20; 178/18.06, 18.09, 19.05; 710/63; 702/64
See application file for complete search history.

(56) References Cited

U.S. PATENT DOCUMENTS

| | | | |
|---|---|---|---|
| 4,631,400 A | | 12/1986 | Tanner et al. |
| 4,794,384 A | | 12/1988 | Jackson |
| 5,793,357 A | * | 8/1998 | Ivey et al. ............. 345/166 |
| 6,806,458 B2 | | 10/2004 | Rotzell et al. |
| 2002/0105656 A1 | | 8/2002 | Nahum et al. |
| 2003/0085879 A1 | | 5/2003 | Shi |
| 2003/0102425 A1 | * | 6/2003 | Rotzoll et al. ............ 250/221 |
| 2005/0001153 A1 | | 1/2005 | Lauffenburger et al. |
| 2005/0062720 A1 | | 3/2005 | Rotzell et al. |
| 2005/0190157 A1 | * | 9/2005 | Oliver et al. ............ 345/166 |
| 2006/0023970 A1 | | 2/2006 | Wang |

(Continued)

FOREIGN PATENT DOCUMENTS

WO 03/049018 A1 6/2003

OTHER PUBLICATIONS

Office Action issued in related U.S. Appl. No. 11/424,764, dated Jun. 10, 2009.

(Continued)

*Primary Examiner* — Lun-Yi Lao
*Assistant Examiner* — Olga Merkoulova
(74) *Attorney, Agent, or Firm* — Griffin & Szipl, P.C.

(57) ABSTRACT

A method for detecting lift from a surface portion of an optical pointing device comprising a coherent light source, a photodetector device including an array of pixels, and extracting motion features including comparators with an adjustable offset value, the method comprising the steps of: (i) illuminating the surface portion with radiation by the coherent light source; (ii) detecting radiation patterns reflected from the illuminated surface portion with the photodetector device; (iii) comparing light intensity between neighbouring pixels in the detected radiation patterns; (iv) extracting motion features as a function of the result of the comparison; (v) counting the total number of motion features extracted; (vi) increasing or decreasing the comparator offset value when the total number of motion features increases or decreases; (vii) comparing the comparator offset value with an offset threshold; (viii) enabling detection of a lift condition if the comparator offset value is lower than the offset threshold.

10 Claims, 1 Drawing Sheet

U.S. PATENT DOCUMENTS

2006/0125794 A1* 6/2006 Afriat .......................... 345/166
2006/0226346 A1 10/2006 Bieber et al.
2007/0290121 A1 12/2007 Bieber et al.

OTHER PUBLICATIONS

Office Action issued in co-pending related U.S. Appl. No. 11/424,764, mailed Jan. 29, 2010.

Office Action issued in co-pending related U.S. Appl. No. 11/424,764, mailed Jul. 20, 2010.

p. 284 and p. 1155 of Webster's Ninth New Collegiate Dictionary (1990), previously filed as Exhibit 1 on Oct. 28, 2009.

O.P. Judd, Diffraction From Circular and Irregular Apertures, LA-5391-MS 1-4 (Los Alamos Scientific Laboratory 1973).

John P. Barton, Electromagnetic Field Calculations for a Sphere Illuminated by a Higher-order Gaussian Beam. II. Far-Field Scattering, 37 Applied Optics 3339-3344 (1998).

Darwin Palima et al., Generalized Phase Contrast Matched to Gaussian Illumination, 15 Optics Express 11971-11977 (2007).

M.J. Wang et al., Investigation on the Scattering Characteristics of Gaussian Beam from Two Dimensional Dielectric Rough Surfaces Based on Kirchhoff Approximation, 4 Progress in Electromagnetics Research B 223-235 (2008).

The Patent family list for WO 03/049018 A1 available from espacenet database, identified as Exhibit A.

* cited by examiner

ENHANCED LIFT DETECTION TECHNIQUE FOR A LASER ILLUMINATED OPTICAL MOUSE SENSOR

FIELD OF THE INVENTION

The present invention generally relates to pointing devices, in particular for controlling the position of a cursor on a screen, such as the display of a personal computer, workstation or other computing devices having a graphic user interface. Such pointing devices may for instance include mice, trackballs and other computer peripherals for controlling the position of a cursor on a display screen.

The present invention more particularly relates to the field of optical pointing devices which comprise an optical motion sensing device including a photodetector array for measuring the varying intensity pattern of a portion of a surface which is illuminated with radiation, for extracting information about the relative motion between the photodetector array and the illuminated portion of the surface and for detecting a lift condition of the optical pointing device from the portion of the surface by analysing the extracted information.

BACKGROUND OF THE INVENTION

Optical pointing devices are already known in the art. U.S. Pat. No. 6,806,458, filed in the name of the same Assignee and which is incorporated in its entirety herein by way of reference, for instance discloses a method, a sensing device as well as an optical pointing device including a sensing device for comparing light intensity between pixels.

U.S. patent application Ser. No. 11/011,164 filed in the name of the same Assignee and published as the US Patent Application Publication No. 2006/0125794, which is incorporated in its entirety herein by way of reference, also discloses a method for detecting a lift condition from an illuminated surface portion of an optical motion sensing device. Providing either two first "loss-of-focus" thresholds, the use of which depends on whether the optical pointing device is moving or not, or a dynamical loss-of-focus threshold depending on an average number of motion features that the surface exhibits to the sensor of the optical pointing device.

However optical pointing device such as mouse using LED as illumination source does not present the expected tracking performances for all kind of surfaces, in particular on wood. Using instead a laser illumination source results in a speckled image detected by the photodetector of the mouse sensor. Then a key problem with this speckled image is that it has a high spatial frequency and is no longer well adapted to the previous methods of "Lift Detection" described in the prior art.

Actually, it is difficult to correctly determine when the mouse is lifted, how to remain in a lift condition, and how to detect when the mouse has been returned to the surface or dropped. As previously discussed, the lift case can be considered as a "loss of focus"; the focal depth of the imaging lens being short, when the mouse is lifted, the image on the sensor will become defocused. When such a "loss of focus" occurs, the optical power on the sensor should drop dramatically. In order to identify a "loss of focus", the drop in optical power could be sensed. One way to do it is to monitor the "Integration Time". The "Integration Time" is the time that the pixel sensor takes to reach a determined target intensity level. When this integration time rapidly increases, then a "Loss of Focus" can be declared. However, these conditions to detect loss of focus are not always sufficient to reliably detect lift. The sensor must properly handle lift mode and avoid detecting false drops to optimize its power consumption.

There are further complications to accurately detect lift. The detection of lift via a drop in optical power is dependent on the accuracy of the sensor and the processing electronics as well as the illumination source. It has been seen that the power does not always drop as expected and that lift is not detected at an acceptably low elevation.

SUMMARY OF THE INVENTION

One goal of the present invention is thus to implement a reliable and simple method for detecting a lift condition of an optical pointing device based on comparison between the current offset voltages of the comparators with an offset threshold.

For that purpose, according to the present invention, it is provided with a method for detecting lift from a surface portion of an optical pointing device comprising a coherent light source, a photodetector device including an array of pixels, and element for extracting motion features including comparators with an adjustable offset, the method comprising the steps of (a) illuminating the surface portion with radiation by the coherent light source; (b) detecting radiation patterns reflected from the illuminated surface portion by the photodetector device; (c) comparing light intensity between neighbouring pixels in the detected radiation patterns; (d) extracting motion features as a function of the result of the comparison; (e) counting the total number of motion features extracted; (f) increasing, respectively decreasing, the comparator offset when the total number of motion features increases, respectively decreases; wherein the method further comprises the steps of: (g) comparing the comparator offset with an offset threshold; (h) enabling detection of a lift condition if the comparator offset is lower than the offset threshold.

Further, the invention advantageously consists in further testing different parameters and combining them logically to detect a lift condition, which form the subject of the dependent claims.

Furthermore, according to another object of the present invention, it concerns an algorithm to properly handle lift mode can be developed as well. The method for handling lift mode consists of testing different parameters and combining them logically to stay in lift mode.

Moreover, according to another object of the present invention, it concerns a method for detecting a drop condition, which is important for a fast response of the sensor. Again a logical combination of parameters can be used.

More specifically, in accordance with a first embodiment of the invention, a method for detecting lift from a surface portion of an optical pointing device is provided, wherein the optical pointing device includes (a) a coherent light source, (b) a photodetector device including an array of pixels, and (c) means for extracting motion features including comparators with an adjustable offset value, and the method includes the steps of: (i) illuminating the surface portion with radiation by means of the coherent light source; (ii) detecting radiation patterns reflected from the illuminated surface portion by means of the photodetector device; (iii) comparing light intensity between neighbouring pixels in the detected radiation patterns; (iv) extracting motion features as a function of the result of the comparison; (v) counting the total number of motion features extracted; (vi) increasing, respectively decreasing, the comparator offset value when the total number of motion features increases, respectively decreases; wherein the method further comprises the steps of: (vii) comparing the comparator offset value with an offset threshold; (viii) enabling detection of a lift condition if the comparator offset value is lower than the offset threshold. According to a second embodiment of the present invention, the first embodiment is modified so that wherein any increase, respectively decrease of the comparator offset value during step (vi) is done in a continuous manner. According to a third embodiment of the invention, the first embodiment is modified so that wherein any increase, respectively decrease, of the comparator offset value during step (vi) is done in a stepwise manner. In accordance with a fourth embodiment of the present invention, the first embodiment is modified so that any increase, respectively decrease, of the comparator offset value during step (vi) is done in order to maintain the total number of extracted motion features within a determined window.

In accordance with a fifth embodiment of the present invention, the first embodiment is modified so that the coherent illumination source illuminates the surface portion at a determined flash rate and wherein the method further comprises, to enable detection of a lift condition, the steps of: (ix) comparing the counted total number of extracted motion features with a determined total number of extracted motion feature threshold; (x) counting an average total number of extracted motion features over at least two flashes and comparing the counted average total number of extracted motion features with a determined average total number of extracted motion feature threshold; and (xi) enabling detection of a lift condition if both counted total number, respectively, average total number of extracted motion features are below than the determined total number, respectively average total number, of extracted motion feature thresholds. In accordance with a six embodiment of the present invention the first embodiment is modified so that the coherent illumination source illuminates the surface portion at a determined flash rate and wherein the method further comprises, to enable detection of a lift condition, the steps of: (xii) adjusting the actual flash rate proportionally to the measured displacement; (xiii) comparing the actual flash rate with a programmable rest flash rate; and (xiv) enabling detection of a lift condition if the actual flash rate is below than or equal to the rest flash rate. In accordance with a seventh embodiment of the present invention, the first embodiment is modified to further include, to enable detection of a lift, the steps of: (xv) comparing the actual integration level with a determined integration lift threshold after a determined time period has elapsed and before a timeout period; and (xvi) enabling detection of a lift condition if the actual integration level is below than the integration lift threshold.

In accordance with an eighth embodiment of the present invention, the first embodiment is modified to that, after detection of a lift condition, a lift mode is enabled, then the method further comprises the step of: (xvii) ignoring loss-of-tracking events. In accordance with a ninth embodiment of the present invention, the first embodiment is modified so that the coherent light illuminates the surface portion at an adjustable flash rate and wherein after detection of a lift condition, a lift mode is enabled, the method further comprising the step of: (xviii) setting the adjustable flash rate to a minimum flash rate value. In accordance with a tenth embodiment of the present invention, the first embodiment is modified so that, after detection of a lift condition, a lift mode is enabled, then the method further comprises the step of: (xix) reducing the offset voltage in order to make the inflection averaging window smaller. In accordance with an eleventh embodiment of the present invention, the tenth embodiment is further modified so that it includes that the steps of: (xx) comparing the current offset voltage with the offset voltage threshold; and (xxi) enabling a drop condition when the current offset voltage is greater than the offset voltage threshold. In accordance with a twelfth embodiment of the present invention, the eighth embodiment is further modified to include the steps of: (xxii) comparing the total number of motion features with the total number of motion feature threshold; and (xxiii) enabling a drop condition when the total number of motion features exceeds the total number of motion feature threshold. According to a thirteenth embodiment of the present invention, the twelfth embodiment further comprises, to enable a drop condition, the steps of: (xxiv) comparing the average total number of motion features with an average total number of motion feature threshold; and (xxv) enabling a drop condition when the average total number of motion features exceeds the average total number of motion feature threshold.

DETAILED DESCRIPTION OF THE INVENTION

Figure 1:
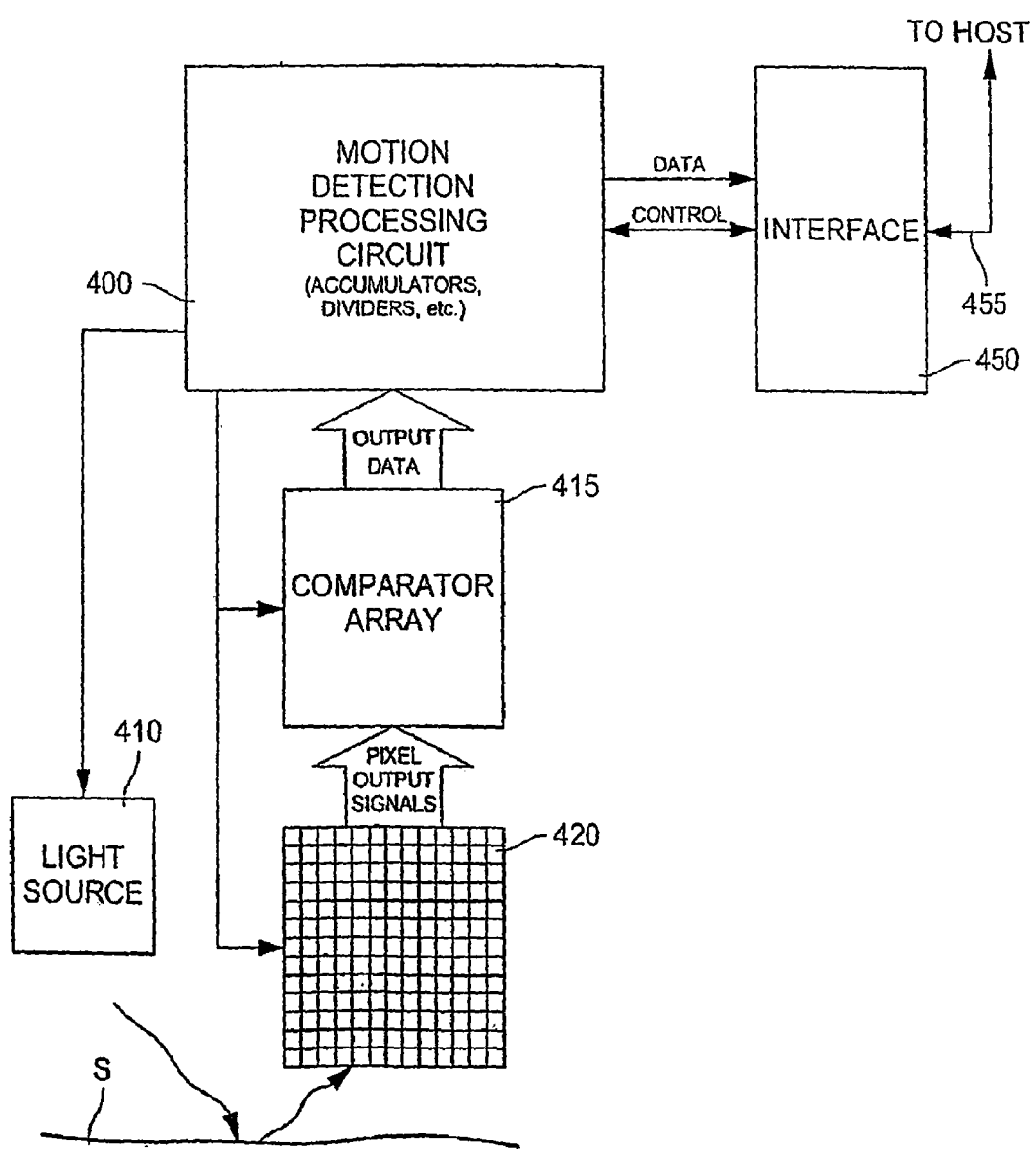
FIG. 1 schematically illustrates an optical pointing device, such as is used to perform steps of the method of the present invention.

Other aspects, features and advantages of the present invention will be apparent upon reading the following detailed description of non-limiting examples and embodiments.

The following description, which concerns a method for reliably detecting a lift of an optical pointing device, a method for properly handling the lift mode, and the method for detecting a drop condition, is given by way of a non limiting example.

The method for detecting a lift condition of an optical pointing device according to the present invention may be based on several tested parameters which each may be sufficient alone to determine such a lift condition. However, it has been shown within the scope of the present invention that with all the surfaces used, any of these criteria is enough reliable if taken alone. According to a preferred embodiment of the invention, one new criterion related to the comparator offset voltage, which depends on at least one other known criterion, has been implemented to insure a more reliable detection of a lift condition. Therefore, according to this embodiment, the method for detecting a lift condition of an optical pointing device is based on the comparison between the offset voltages of the comparators with an offset threshold. In fact, the number of inflections falls down as the mouse is lifted and the image is defocused, then detection of the offset voltage falling below the offset threshold, is used as a condition for lift detection.

The offset voltage may advantageously be controlled by an offset control algorithm described in a co-pending patent application filed in the name of the same Assignee entitled "optimization of statistical movement measurement for optical mouse with particular application to laser illuminated surfaces" as described in the U.S. patent application Ser. No. 11/424,764, which is published as U.S. Patent Application Publication No. US 2007/0290121 A1, filed in the name of the same Assignee. Further the offset voltage in accordance with the present invention is decreased during lift to increase the number of extracted motion features. Respectively, the offset voltage is increased during drop to decrease the number of extracted motion features. Variations of the offset voltage in function of the total number of extracted motion features may be done in several manners among with a continuous or stepwise variation, a consideration of an average total number of extracted motion features or also in order to maintain this total number of extracted motion features within a determined range or window of values.

In order to implement this method, it is provided with an optical pointing device, as shown in FIG. 1, wherein the optical pointing device comprises a coherent light source 410, a photodetector device including an array 420 of pixels, and means for extracting motion features including an array 415 of comparators with an adjustable offset, wherein the array 415 of comparators is coupled to receive pixel output signals from the array 420 of pixels of the photodetector device and to send data as output to a processing means 400 (i.e., a motion detection processing circuit), wherein the processing means 400 is further adapted to communicate in a bidirectional manner, using data and control signals, with an interface 450 that communicates in turn with a host system (not otherwise illustrated) over a bus 455. Relative motion measurement is extracted by the processing means 400 from the data received from the comparators 415, and adequate cursor control signals and other signals related to the optical pointing device, such as a lift detection signal, are then derived from the relative motion measurement and transmitted to the host system via line interface 450.

The method of the present invention, for detecting lift from a surface portion of an optical pointing device, comprises the steps of:

i) illuminating a surface portion S with radiation by means of the coherent light source 410;
ii) detecting radiation patterns reflected from the illuminated surface portion by means of the photodetector device 420;
iii) comparing light intensity between neighbouring pixels in the detected radiation patterns (using the array 415 of comparators);
iv) extracting motion features as a function of the result of the comparison (using the processing means 400);
v) counting the total number of motion features extracted (using the processing means 400);
vi) increasing, or respectively decreasing, the comparator offset value when the total number of motion features increases, or respectively decreases (see output from processing means 400 to comparators 415 in FIG. 1);

wherein the method further comprises the steps of:
vii) comparing the comparator offset value with an offset threshold;
viii) enabling detection of a lift condition if the comparator offset value is lower than the offset threshold.

Furthermore, the lift detection algorithm advantageously consists in further testing different parameters and combining them logically to detect a lift condition.

A first additional parameter that may be further tested is actually a couple of parameters including the average count of extracted motion features and the current count of extracted motion features, since the total number of motion features does not reliably decrease as the optical pointing device is lifted, especially with a laser illumination source.

One may consider the motion detection algorithms described in the US Patent Application Publication No. 2005/0062720 filed in the name of the same Assignee and incorporated herewith in its entirety by way of reference, to determine the extracted motion features. For instance, when comparing light intensity between neighbouring pixels of the photodetector array, one may determine edge direction data from the detected light intensity pattern, which data is descriptive of light intensity differences between the neighbouring pixels and includes a first edge condition, or positive edge, defined as a condition wherein the light intensity of a first pixel is less than the light intensity of a second pixel; and a second edge condition, or negative edge, defined as a condition wherein the light intensity of the first pixel is greater than the light intensity of the second pixel. On the basis of these edge conditions, one may further extract motion features by extracting edge inflection data from said edge direction data, said edge inflection data being descriptive of the succession of positive and negative edges along at least one determined axis of the photodetector array and including a first inflection condition, or peak, defined as the succession, along the determined axis, of a positive edge followed by a negative edge; and a second inflection condition, or null, defined as the succession, along the determined axis, of a negative edge followed by a positive edge.

As previously mentioned the total number of motion features, for instance the inflection count, does not monotonically decrease with elevation. Therefore, an improvement for detecting lift is to monitor the inflection count and the average inflection count. When these parameters fall below an average inflection count threshold and an inflection count threshold, respectively, then two more logical measures of lift are met.

Another additional parameter that may be tested by the lift detection algorithm in order to detect more reliably a lift consists in checking the flash rate, which may be proportional to the displacement that is measured by the sensor as described in the US Patent Application Publication No. 2005/0001153 filed in the name of the same Assignee and which is incorporated herewith in its entirety by way of reference. As the mouse is lifted, the overall displacement decreases, and when the actual flash rate is less than or equal to a programmable rest flash rate, preferably the minimum flash rate, the lift detection algorithm will use this condition as an additional condition for asserting a lift condition.

Another additional parameter that may be tested by the lift detection algorithm to detect more reliably a lift consists in checking a target integration level. The target integration level is a programmable value that sets the voltage at which the integration of light on a pixel terminates. As the mouse is lifted, the light power theoretically drops. On some dark surfaces the actual integration level will never reach the target integration level. For that purpose, a timeout period may be provided nonetheless in order to stop integration. However, a timeout occurrence should not be seen as a lift condition, since that will remove trackability on some dark surfaces. Instead, one additional step is provided before timeout, which consists in comparing the actual integration level to an integration lift threshold that is lower than the target integration level. Thus, the algorithm detects when the actual integration level falls below the integration lift threshold, preferably the minimum integration threshold. Thus, we detect this lift condition either when the mouse is lifted or when the mouse is on a very dark surface, where the pixels reached such low levels of signal, that in any case are not usable for reasonable tracking.

Moreover, according to another object of the present invention, it also concerns an algorithm to properly handle lift mode. This method for handling lift mode consists of testing different parameters and combining them logically to stay in lift mode after the lift detection algorithm has detected a lift and consequently the optical pointing device has entered a low power consumption mode or lift mode.

As described in the US Patent Application Publication No 2005/0062720, which is incorporated herewith in its entirety by way of reference, the sensor of the optical pointing device may detect a "loss-of-tracking" condition. In fact, inflections are assumed to be moving through the photodetector array and those inflections should not move more than one pixel pitch between two flashes (the period between two successive flashes being determined so that this condition is always satisfied for a given maximum speed of motion). If an inflection moved more than one pixel pitch, the motion detection scheme cannot determine where the inflection came from. This condition will occur if the sensor is moving too fast with respect to the illuminated surface between two flashes, this condition being therefore representative of a "loss-of-tracking" situation. This condition can be detected by looking at the number of edge inflection conditions that appear to come from nowhere, i.e. the last state inflection conditions do not have a similar edge inflection condition in its current position or one pixel pitch around it. Those edge inflection conditions might be defined as "ghost edge inflection conditions" (such "ghost edge inflection conditions" potentially appearing along both axes). The number of "ghost edge inflection conditions" can thus be tested and compared to a predetermined "loss-of-tracking" threshold. If the count of ghost inflections is larger than the predetermined "loss-of-tracking" threshold, a "loss-of-tracking" condition may be detected and reported.

In accordance with the present invention, when the lift mode has been enabled and therefore when the algorithm to properly handle lift mode is running, the sensor ignores loss-of-tracking events as these will improperly trigger the sensor to transition to a high power mode and the maximum flash rate.

In the same manner, when the lift mode has been enabled, the flash rate may be set to a programmable minimum flash rate.

Furthermore, the optical pointing device should be able to detect a drop condition quickly so that no 'real' motion is lost. For that purpose, advantageously, the inflection count averaging window is used to control the offset voltage algorithm and is also tuned during a lift condition to a reduced value to make the inflection averaging window small so that a change of inflection count is quickly recognized.

Moreover, according to another object of the present invention, it also concerns a method for detecting a drop condition, which is important for a fast response of the sensor. Again a logical combination of parameters can be used. When the mouse is dropped, the offset voltage level will rise to reduce the number of inflections. One condition for drop is met when this offset voltage is greater than the offset voltage threshold. A threshold for the average number of inflections may be programmed and the average number of inflections is compared to this value. When the average exceeds the threshold another condition for drop is met. As described in the previous item, the inflection count rises when the mouse is dropped. The number of inflections is compared to the inflection threshold value. If the number of inflections is greater than the inflection threshold value, a condition for drop is met.

As a summary, when the optical pointing device operates in a normal motion detection mode, a lift detection algorithm checks first if the offset voltage of the comparators falls below the offset voltage threshold, corresponding to the minimum offset voltage of the comparators required to correctly track motion. If so, the optical pointing device goes to the lift mode, i.e. a low consumption mode.

Advantageously, in addition to the just abovementioned criterion, the lift detection algorithm may further need another or several other criteria to switch the optical pointing device from the motion detection mode to the lift mode. These additional criteria may be chosen among with the following. The average inflection count falls below the average inflection threshold. The inflection count falls below the inflection threshold. The flash rate falls below the flash rate rest. The integration level falls below the integration threshold.

Once lift is detected. Loss-of-tracking events are ignored. The flash rate is set to a programmable minimum flash rate value. And the averaging inflection window is reduced for a quick recovery of the offset algorithm lift.

Detecting drop in order to exit the lift mode and return the normal motion detection mode is met by any combination of the following conditions. The offset voltage becomes greater than the offset voltage threshold. The average inflection count becomes greater than the average inflection threshold. The inflection count becomes greater than the inflection threshold. The integration level becomes greater than the integration level threshold.

Having described the invention with regard to certain specific embodiments, it is to be understood that these embodiments are not meant as limitations of the invention. Indeed, various modifications and/or adaptations may become apparent to those skilled in the art without departing from the scope of the annexed claims. For example, another condition that may be used for lift and drop detections is modulation of the laser and test of the correlation of the integration time to the laser modulation.

What is claimed is:

1. A method for detecting lift from a surface portion of an optical pointing device, wherein the optical pointing device comprises (a) a coherent light source; (b) a photodetector device including an array of pixels; and (c) means for extracting motion features, wherein the means for extracting motion features includes comparators provided with an adjustable offset value, wherein the method comprises the steps of:
   (i) illuminating the surface portion with radiation by means of the coherent light source;
   (ii) detecting radiation patterns reflected from the illuminated surface portion by means of the photodetector device;
   (iii) comparing light intensity between neighbouring pixels in the detected radiation patterns;
   (iv) extracting motion features as a function of the result of the comparison of light intensity;
   (v) counting a total number of motion features extracted;
   (vi) increasing the adjustable offset value of the comparators when the total number of motion features increases, and decreasing the adjustable offset value of the comparators when the total number of motion features decreases;
   (vii) comparing the adjustable offset value with an offset threshold using the comparators of the means for extracting motion features; and
   (viii) enabling detection of a lift condition when the adjustable offset value is lower than the offset threshold.

2. The method according to claim 1, wherein when the total number of motion features increases, the increase of said adjustable offset value during step (vi) is done in order to maintain the total number of extracted motion features within a determined window, and when the total number of motion features decreases, the decrease of said adjustable offset value during step (vi) is done in order to maintain the total number of extracted motion features within the determined window.

3. The method according to claim 1, wherein said coherent illumination source illuminates said surface portion at a determined flash rate and wherein the method further comprises the following steps in order to enable detection of the lift condition:
   (ix) comparing said counted total number of extracted motion features with a determined total number of extracted motion feature threshold;
   (x) counting an average total number of extracted motion features over at least two flashes of said coherent illumination source and comparing said counted average total number of extracted motion features with a determined average total number of extracted motion feature threshold; and (xi) enabling detection of the lift condition when the counted total number and the average total number of extracted motion features are less than said determined total number, and said determined average total number, of extracted motion feature thresholds, respectively.

4. The method according to claim 1, wherein said coherent illumination source illuminates said surface portion at an adjustable flash rate and wherein the method further comprises the following steps in order to enable detection of the lift condition:

(ix) adjusting the adjustable flash rate proportionally to a measured displacement;

(x) comparing the adjustable flash rate with a programmable rest flash rate; and (xi) enabling detection of the lift condition when said adjustable flash rate is less than or equal to said programmable rest flash rate.

5. The method according to claim 1, wherein the method further comprises the following steps in order to enable detection of the lift condition:

(ix) comparing an actual integration level with a determined integration lift threshold after a determined time period has elapsed and before a timeout period; and (x) enabling detection of the lift condition when said actual integration level is less than said determined integration lift threshold.

6. The method according to claim 1, wherein after detection of the lift condition, a lift mode is enabled, then the method further comprises the step of:

(ix) ignoring loss-of-tracking events.

7. The method according to claim 6, wherein the method further comprises the steps of:

(x) comparing the total number of motion features with a total number of motion feature threshold; and (xi) enabling a drop condition when the total number of motion features exceeds the total number of motion feature threshold.

8. The method according to claim 7, wherein the method further comprises the following steps in order to enable detection of the drop condition:

(xii) comparing the average total number of motion features with an average total number of motion feature threshold; and (xiii) enabling the drop condition when the average total number of motion features exceeds the average total number of motion feature threshold.

9. The method according to claim 1, wherein the coherent light source radiates coherent light that illuminates the surface portion at an adjustable flash rate, wherein after detection of the lift condition, a lift mode is enabled, and wherein the method further comprises the step of:

(ix) setting said adjustable flash rate to a minimum flash rate value.

10. The method according to claim 1, wherein after detection of the lift condition, a lift mode is enabled, and wherein the method further comprises the steps of:

(ix) comparing the current adjustable offset value with the offset threshold; and (x) enabling detection of a drop condition when the current adjustable offset value is greater than the offset threshold.

* * * * *